United States Patent [19]
Resio et al.

[11] Patent Number: 5,702,203
[45] Date of Patent: Dec. 30, 1997

[54] FLOATING "V" SHAPED BREAKWATER

[75] Inventors: Donald T. Resio; Michael J. Briggs; Jimmy E. Fowler; Dennis G. Markle, all of Vicksburg, Miss.

[73] Assignee: U.S. Army Corps of Engineers as represented by the Secretary of the Army, Washington, D.C.

[21] Appl. No.: 444,348

[22] Filed: May 18, 1995

[51] Int. Cl.$^6$ ............................................. E02B 3/00
[52] U.S. Cl. ................................................ 405/26; 405/66
[58] Field of Search ................................. 405/25, 34, 26, 405/27, 66, 67

[56] References Cited

U.S. PATENT DOCUMENTS

| | | | |
|---|---|---|---|
| 230,537 | 7/1880 | Elliot | 405/21 |
| 2,185,458 | 1/1940 | Giliasso | 405/26 |
| 5,062,739 | 11/1991 | Klockner | 405/26 X |
| 5,310,283 | 5/1994 | Berg | 405/67 |

Primary Examiner—William P. Neuder
Attorney, Agent, or Firm—Luther A. Marsh

[57] ABSTRACT

The present invention pertains to a floating breakwater structure in the shape of a "V". This breakwater design allows for a wide range of wave periods, unlike previous floating breakwaters. The construction of the instant invention is that of a suspended curtain which deflects and redirects the waves that are incident thereto rather than absorb or reflect incoming wave energy. This design results in a substantially smaller structure with reduced mooring loads. Moreover, the floating breakwater of the instant invention allows for fast deployment that can be either shipped in sections and assembled on site or assembled in sheltered waters and towed to a site for deployment. The breakwater of the instant invention is intended for temporary coastal operations such as military force projection and sustainment, dredging, coastal civil construction and repair, oil spill recovery, and search/rescue relief missions.

16 Claims, 2 Drawing Sheets

FLOATING "V" SHAPED BREAKWATER

STATEMENT OF GOVERNMENT INTEREST

The invention described herein may be manufactured and used by or for the United States Government for governmental purposes without the payment of any royalties thereon.

FIELD OF THE INVENTION

This invention pertains to a floating breakwater structure.

BACKGROUND OF THE INVENTION

Breakwater structures are necessary for effective shore landings of troops and supplies for a successful military operation. Often, such an operation is limited by ocean wave conditions that are encountered. An operation in coastal waters is usually aborted when waves exceed a sea state 2 where wave heights are greater than 3 feet. Breakwaters previously used for such an operation have included floating tire, submerged barges, etc., that reduce incoming wave heights to acceptable levels for landing craft. Other examples of such structures include U.S. Pat. Nos. 5,062,739 and 5,141,359 by Klockner entitled "Zigzag Breakwater." These patents describe a sea embedded or floating breakwater structure that structurally use a zigzag design.

However, these prior structures have met with limited success and are not used in an oceanic environment since they cannot effectively attenuate longer period oceanic swell waves. Moreover, most of these prior breakwater structures are intended for permanent use, not for an expedient temporary use which allows for a readily assembled and disassembled breakwater structure. Examples of operations where this is a requirement include military force projection and sustainment, dredging operations, coastal civil construction and repair, oil spill recovery, and search/rescue missions. These problems are solved by the floating "V" breakwater structure of the instant invention.

SUMMARY OF THE INVENTION

The present invention pertains to a floating breakwater structure in the shape of a "V". This breakwater design allows for a wide range of wave periods, unlike previous floating breakwaters. The construction of the instant invention is that of a suspended curtain which deflects and redirects the waves that are incident thereto rather than absorb or reflect incoming wave energy. This design results in a substantially smaller structure with reduced mooring loads. Moreover, the floating breakwater of the instant invention allows for fast depolyment that can be either shipped in sections and assembled on site or assembled in sheltered waters and towed to a site for depolyment. The breakwater of the instant invention is intended for temporary coastal operations such as military force projection and sustainment, dredging, coastal civil construction and repair, oil spill recovery, and search/rescue relief missions.

OBJECTS OF THE INVENTION

Accordingly, several objects of the invention herein are:

(a) To provide a floating breakwater structure that has a simple design that functions by use of the geometric wave spreading principle that allows such a structure to withstand a wide range of incident waves of varying periods.

(b) To provide a floating breakwater structure that has a simple design that can deflect and redirect the waves rather than absorb or reflect incoming wave energy. This design substantially reduces both the size of a breakwater structure and attendant imposed mooring loads.

(c) To provide a floating breakwater structure that functions as an effective wave barrier that can effectively attenuate incoming incident wave energy.

(d) To provide a floating breakwater structure that can be depolyed quickly by being shipped in sections and assembled on site or assembled in sheltered waters and towed to an operations location.

Still further advantages will become from consideration of the ensuing detailed description.

DETAILED DESCRIPTION

Figure 1:
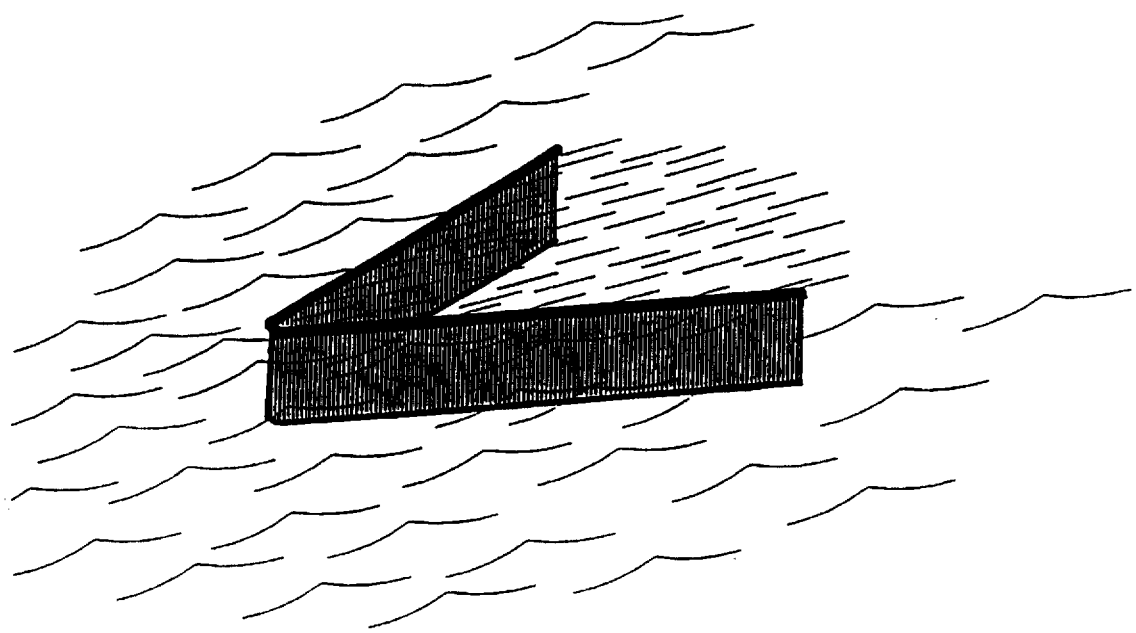
FIG. 1 shows the floating curtain breakwater structure with a reduction of wave height in the lee side of the structure.

The floating curtain breakwater (FCB) of the instant invention is shown in FIG. 1. The FCB has a V-type shape in plan view which spreads wave fronts apart based on geometric spreading and coupled deflections of wave motion. Thus, it works by spreading and deflecting the incoming waves. Incident waves are deflected at the apex of the "V" providing a sheltered area inside the "V" and in the lee of the structure. Each leg of the "V" should be at least three wavelengths long. The two legs are joined at the front of the FCB and supported with diagonal braces to insure structural stiffness. mooring loads are minimized because the structure is designed to deflect incoming waves rather than absorb and reflect hem. Mooring points will be at the apex or front of the "V" and along each leg at sufficient points to prevent excessive movement. Standard spread mooring methods can be used.

Figure 2:
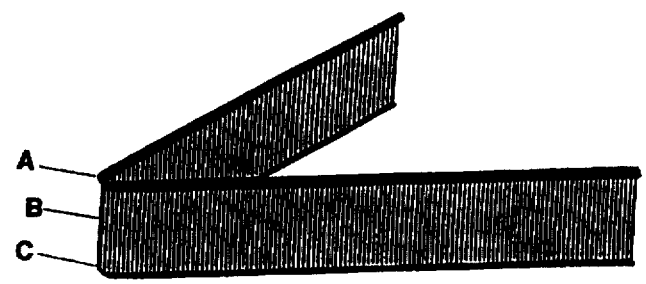
FIG. 2 shows the components of the invention.

The legs are composed of two structural members, A, and B, and a curtain C connecting them as shown in FIG. 2. Member A provides flotation and freeboard to minimize overtopping. member B provides ballast or weight. The curtain C is connected to Members A and B and extends through the water column to deflect wave energy using the principles of refraction, and diffraction. Total depth of the curtain is sufficient to deflect most of the wave energy. The curtain C will be constructed from reinforced rubber or synthetic material such as rip-stock nylon. The reinforcement can be steel cables aligned vertically to hold the weight of the curtain and withstand the force of waves and currents. The curtain can include cutouts, much like a sail, to reduce drag forces on the curtain by allowing deeper currents to flow through. The curtain will be attached to members A and B using a "draw string" mechanism much like a window curtain. Longitudial slots along the bottom of member A and top of member B would allow the curtain to slide along the length of the breakwater on glides or rollers. The curtain C can also be attached to members A and B by wrapping around the exterior circumference. The curtain can be unfolded or unwrapped by allowing member B to flood and sink in a controlled manner to its design depth. The curtain can be wrapped around member A or member B and unrolled like a window "roller shade." An alternative is to "fan-fold" the curtain in "accordion" fashion and sink member B in a controlled manner.

Figure 3:
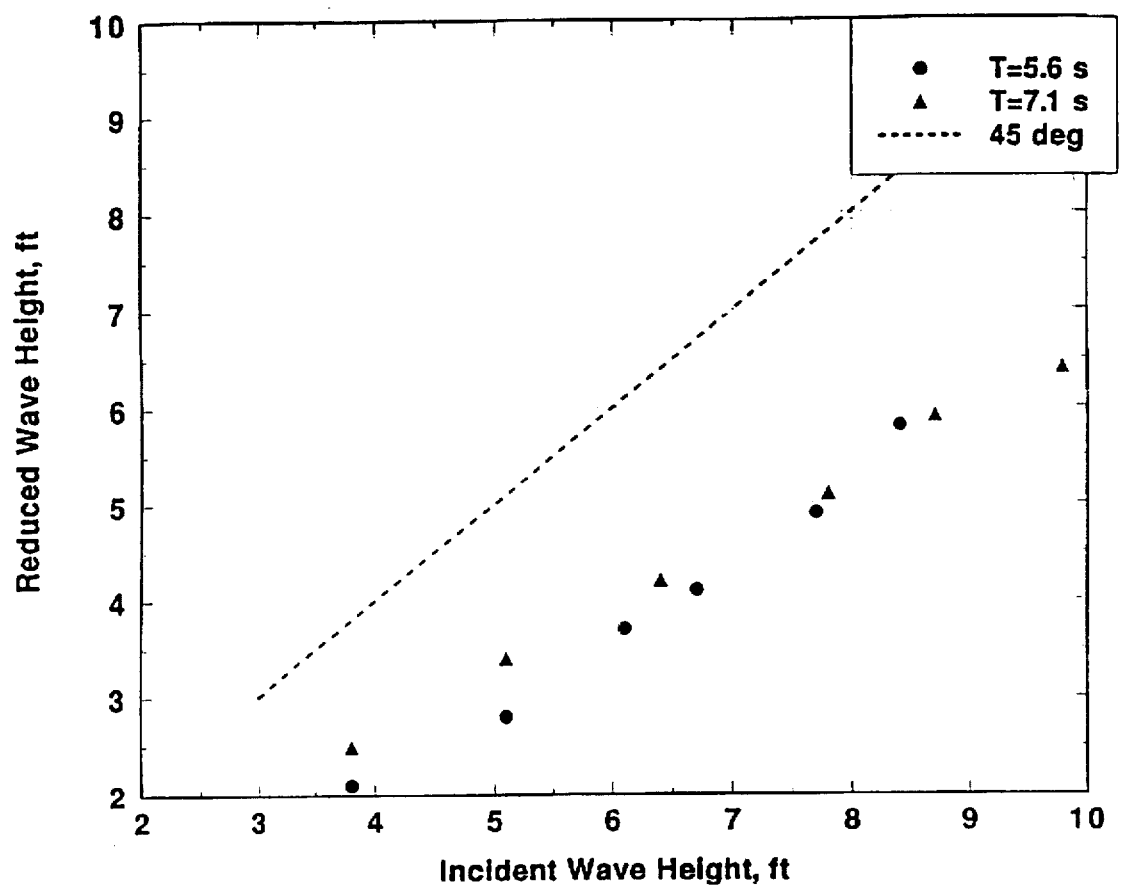
FIG. 3 shows test results as to the effect of the floating curtain breakwater structure on wave height.

Tests of the invention indicate that incident wave energy is reduced one sea state inside and in the lee side of the breakwater ass shown in FIG. 3. The test used waves with a period of 5.6 and 7.1 seconds. The 45° diagonal dashed line is shown to contrast the reduced wave height with respect to the incident wave height.

Alternative designs of the FCB and described below include the front of the breakwater can be closed and streamlined by building the front as the bow of a ship. This would reduce drag loads, improve towing capability, and reduce wave energy inside the breakwater. The breakwater design can also have a front that is not completely closed, i.e. a gap is incorporated in the apex of the "V." A trench is dug that is aligned with the centerline of the breakwater, i.e. bisecting the angle of the "V". This gap can be wide enough to allow passage of a ship. The trench should be 5 to 10 ft deeper than the existing bottom to allow wave energy to diffract away from the center of the breakwater. This concept can also be used for traversing a surf zone area. In certain operations, a dual FCB design approach can be used where a "closed front" breakwater is used in deeper water where ships exchange cargo with lighterage vessels and a "gap and trench" breakwater is used in a surf zone region to allow the lighterage vessels to discharge their cargo ashore.

Additional vertical tubular columns can be added along the length of each leg to provide stiffness and rigidity. The entire structure can include mechanisms for adjusting or telescoping the FCB structure for prevailing sea conditions so that the length of each leg is increased or decreased according to the encountered wave conditions. Moreover, proper ballasting equipment can be incorporated to adjust the freeboard of the structure. Moreover, the individual legs of the breakwater do not have to be the same length. The legs may be segmented and offset at different angles to allow current flow through the FCB for improved performance. Finally, more than one FCB structure may be nestled with one inside the other or serially deployed with openings in between each for improved sea conditions in a deployed area of use.

Although the description above contains many specificities, these should not be construed as limiting the scope of this invention as set forth in the appended claims, but as merely providing illustration of the presently preferred embodiment of this invention.

We claim:

1. A floating V-type breakwater structure comprising essentially of at least one floating curtain breakwater (FC) unit with two straight-line stationary leg elements of a "V" formed unit with a means for mooring to the sea bottom, the two legs are composed of two structural members where:
   a first member provides a means for i) floating the structure and ii) sufficient freeboard for the structure to minimize wave overtopping;
   a second member provides a means for ballasting the structure; and
   a curtain member connecting the first and second members that extends through a water column between the first and second members, the curtain deflects incident wave front energy;
whereby the structure spreads and deflects incident wave front energy using principles of refraction and diffraction thereby providing a sheltered area in a lee side of the structure.

2. The floating V-type breakwater structure of claim 1 wherein the two legs of the "V" are at least three wavelengths long thereby yielding optimal performance by the structure.

3. The floating V-type breakwater structure of claim 1 wherein the two legs of the "V" are of different lengths.

4. The flating V-type breakwater structure of claim 1 wherein the two legs of the "V" are not joined at the apex and have an opening to allow marine vessels to pass through.

5. The floating V-type breakwater structure of claim 1 wherein the two legs are joined at the front of the structure at an apex and supported with diagonal braces to insure structural stiffness.

6. The floating V-type breakwater structure of claim 5 wherein mooring points of the structure are at the apex and along each leg at locations whereby excessive movement is minimized.

7. The floating V-type breakwater structure of claim 1 wherein the curtain is constructed of a pliable reinforced material.

8. The floating V-type breakwater structure of claim 7 wherein the curtain includes steel cable reinforcement elements aligned vertically to hold the curtain's weight thereby withstanding the force of waves and currents.

9. The floating V-type breakwater structure of claim 7 wherein the curtain includes cutouts thereby reduced curtain drag forces occur by allowing water currents to flow through the curtain.

10. The floating V-type breakwater structure of claim 1 wherein the curtain includes a mechanism for attaching to the first and second members a "draw string" device with longitudinal slots along the bottom of the first member and top of the second member thereby allowing the curtain to slide along the length of the breakwater legs.

11. The floating v-type breakwater structure of claim 1 wherein the curtain includes means for attaching the curtain to the first and second members by a means for wrapping the curtain around the exterior circumference of the first and second members whereby the curtain is unwrapped when the second member is flooded and sank at an operational location.

12. The floating V-type breakwater structure of claim 11 wherein the curtain includes a means for unfurling the curtain whereby the curtain is unwrapped in a "roller shade" manner.

13. The floating V-type breakwater structure of claim 11 wherein the curtain includes a means for unfurling the curtain whereby the curtain is unwrapped in a "fan-fold" manner.

14. The floating V-type breakwater structure of claim 13 wherein the curtain is segmented with open parrallel slot openings with means for adjusting the opening size.

15. The floating V-type breakwater structure of claim 1 wherein at least one more FCB unit is nestled inside a first FCB unit.

16. The floating V-type breakwater structure of claim 1 wherein more than one FCB unit is serially deployed with a first FCB unit.

* * * * *